United States Patent
Jheng et al.

(10) Patent No.: US 10,536,878 B2
(45) Date of Patent: Jan. 14, 2020

(54) USER EQUIPMENT AND METHODS FOR PDCP DUPLICATION IN 5G RAN

(71) Applicant: Mediatek Inc., Hsin-Chu (TW)

(72) Inventors: Yu-Syuan Jheng, Hsinchu (TW); Pavan Santhana Krishna Nuggehalli, San Jose, CA (US); Pradeep Jose, Cambridge (GB); Chia-Chun Hsu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 2 days.

(21) Appl. No.: 15/928,579

(22) Filed: Mar. 22, 2018

(65) Prior Publication Data

US 2018/0279168 A1   Sep. 27, 2018

Related U.S. Application Data

(60) Provisional application No. 62/475,981, filed on Mar. 24, 2017.

(51) Int. Cl.
*H04W 28/04* (2009.01)
*H04W 76/20* (2018.01)
(Continued)

(52) U.S. Cl.
CPC ............ *H04W 28/04* (2013.01); *H04L 5/001* (2013.01); *H04W 76/20* (2018.02); *H04W 76/28* (2018.02);
(Continued)

(58) Field of Classification Search
CPC ..... H04W 76/20; H04W 76/15; H04W 76/28; H04W 28/04; H04W 28/0205; H04W 28/0236; H04W 28/02; H04L 5/001
(Continued)

(56) References Cited

U.S. PATENT DOCUMENTS 8,605,674 B2 * 12/2013 Park .................. H04L 1/08
370/329
8,958,422 B2 * 2/2015 Celik ................. H04L 1/1841
370/389

(Continued)

FOREIGN PATENT DOCUMENTS

| WO | 2016021661 A1 | 2/2016 |
| WO | 2017000863 A1 | 1/2017 |
| WO | 2017039283 A1 | 3/2017 |

OTHER PUBLICATIONS

International Search Report of PCT/CN2018/080270, dated Jun. 13, 2018.

*Primary Examiner* — Man U Phan
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a UE. The UE receives a radio bearer configuration. The UE also configures, based on the received radio bearer configuration, a radio bearer including a first logical channel on a first carrier and a second logical channel on a second carrier. The UE further determines whether to activate the radio bearer to perform duplication. In response to a determination to activate the radio bearer to perform duplication, the UE communicates a first packet on the first logical channel and communicates a duplicated first packet on the second logical channel.

21 Claims, 15 Drawing Sheets

(51) Int. Cl.
  *H04W 76/28* (2018.01)
  *H04L 5/00* (2006.01)
  *H04W 76/15* (2018.01)
  *H04W 28/02* (2009.01)

(52) U.S. Cl.
  CPC .... *H04W 28/0205* (2013.01); *H04W 28/0236* (2013.01); *H04W 76/15* (2018.02)

(58) Field of Classification Search
  USPC ........................................................ 370/329
  See application file for complete search history.

(56) References Cited

U.S. PATENT DOCUMENTS

| | | | |
|---|---|---|---|
| 10,142,799 B2* | 11/2018 | Horn | H04W 80/02 |
| 10,172,179 B2* | 1/2019 | Van Lieshout | H04L 1/1829 |
| 10,237,784 B2* | 3/2019 | Loehr | H04W 28/065 |
| 2017/0201603 A1* | 7/2017 | Uchino | H04W 36/02 |
| 2017/0303170 A1* | 10/2017 | Uchino | H04W 16/32 |
| 2018/0124647 A1* | 5/2018 | Dai | H04W 72/08 |
| 2018/0139646 A1* | 5/2018 | Basu Mallick | H04W 28/085 |
| 2018/0270718 A1* | 9/2018 | Wang | H04W 36/023 |
| 2018/0279262 A1* | 9/2018 | Babaei | H04L 1/00 |

* cited by examiner

USER EQUIPMENT AND METHODS FOR PDCP DUPLICATION IN 5G RAN

CROSS-REFERENCE TO RELATED APPLICATION(S)

This application claims the benefit of U.S. Provisional Application Ser. No. 62/475,981, entitled "USER EQUIPMENT AND METHODS FOR PDCP DUPLICATION IN 5G RAN" and filed on Mar. 24, 2017, which is expressly incorporated by reference herein in its entirety.

BACKGROUND

Field

The present disclosure relates generally to mobile communication systems, and more particularly, to user equipment (UE) that supports packet data convergence protocol (PDCP) duplication in 5G radio access network (RAN).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The radio interface protocol stack architecture between a UE and the RAN includes a plurality of protocols distributed and implemented in different nodes in the RAN. For example, a radio resource control (RRC) protocol is implemented in the UE and a radio network controller (RNC), and mainly adapted to implement the RRC connection management, radio bearer management, paging/broadcasting, mobility management, and other functions. The RRC protocol is responsible for configuring parameter information of the other protocol entities in the radio interface protocol stack. A radio link control (RLC) protocol is implemented in the UE and the RNC, and mainly adapted to implement the data transmission function of user data and provides three data transmission modes respectively suitable for transmitting service data with different QoS requirements. A media access control (MAC) protocol is generally implemented in the UE and RNC and responsible for selecting suitable transmission formats for the user data and realizing the mapping from logical channels to transport channels. A packet data convergence protocol (PDCP) is implemented in the UE and RNC. The PDCP protocol respectively performs header compression and decompression of the IP data stream in the transmitting and receiving entities, for example, the TCP/IP and RTP/UDP/IP header compression manners are corresponding to particular combinations of network layers, transport layers, or upper layer protocols. The PDCP protocol further has the function of user data transmission, that is, forwarding the PDCP-service data units (SDUs) from the non-access stratum to the RLC layer, in which if the lossless SRNS relocation function is supported, the PDCP-SDU and the corresponding serial number are forwarded, so as to multiplex a plurality of different RBs into the same RLC entity. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a radio bearer configuration. The UE also configures, based on the received radio bearer configuration, a radio bearer including a first logical channel on a first carrier and a second logical channel on a second carrier. The UE further determines whether to activate the radio bearer to perform duplication. In response to a determination to activate the radio bearer to perform duplication, the UE communicates a first packet on the first logical channel and communicates a duplicated first packet on the second logical channel.

In another aspect, an apparatus for a wireless communication includes a processor and a memory device coupled to the processor. The memory device contains a set of instructions that, when executed by the processor, cause the processor to receive a radio bearer configuration. The set of instructions further cause the processor to configure, based on the radio bearer configuration, a radio bearer including a first logical channel on a first carrier and a second logical channel on a second carrier. The set of instructions also cause the processor to determine whether to activate the radio bearer to perform duplication and communicate a first packet on the first logical channel and a duplicated first packet on the second logical channel in response to a determination to activate the radio bearer to perform duplication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various

DETAILED DESCRIPTION

Figure 1:
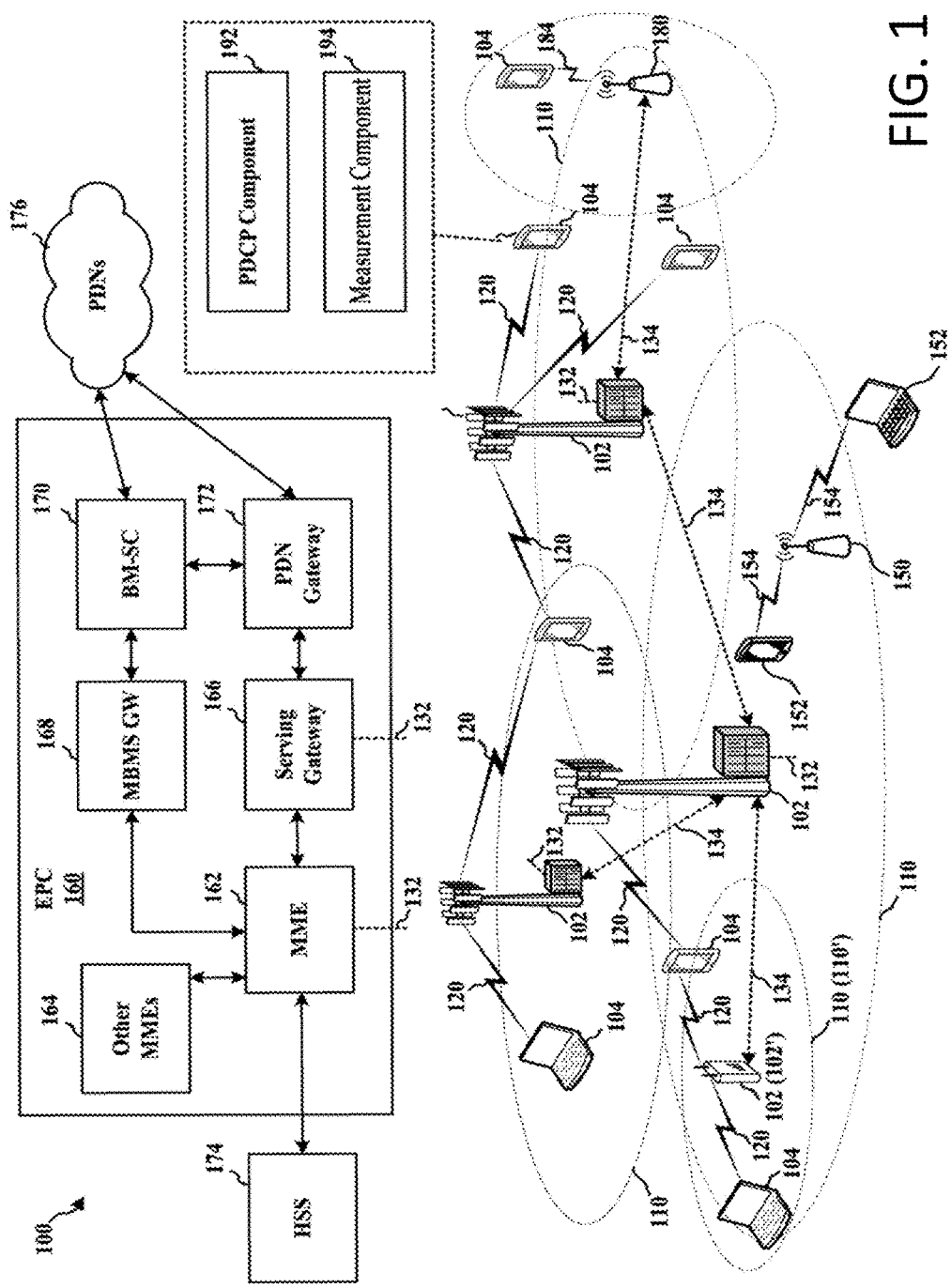
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 receives a radio bearer configuration. The UE 104 also configures, based on the received radio bearer configuration, a radio bearer including a first logical channel on a first carrier and a second logical channel on a second carrier. The UE 104 further determines whether to activate the radio bearer to perform duplication. In response to a determination to activate the radio bearer to perform duplication, the UE 104 communicates a first packet on the first logical channel and communicates a duplicated first packet on the second logical channel.

Figure 2:
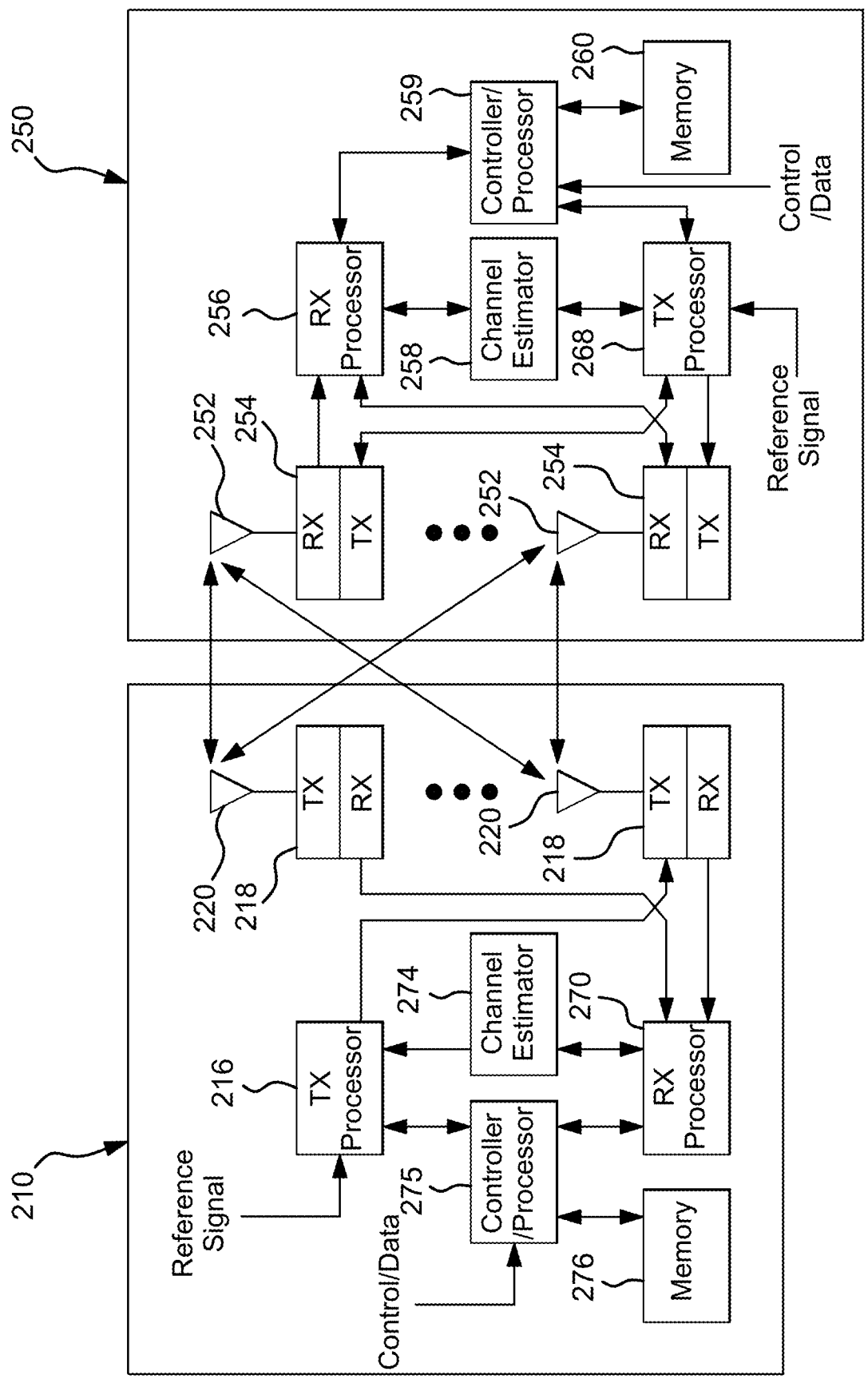
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a RRC layer, and layer 2 includes a PDCP layer, a RLC layer, and a MAC layer. The controller/processor 275 provides RRC layer functionality associated with broadcasting of system information (e.g., MIB, SIBs), RRC connection control (e.g., RRC connection paging, RRC connection establishment, RRC reconfiguration, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 0.2 ms. Each subframe may indicate a link direction (i.e., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
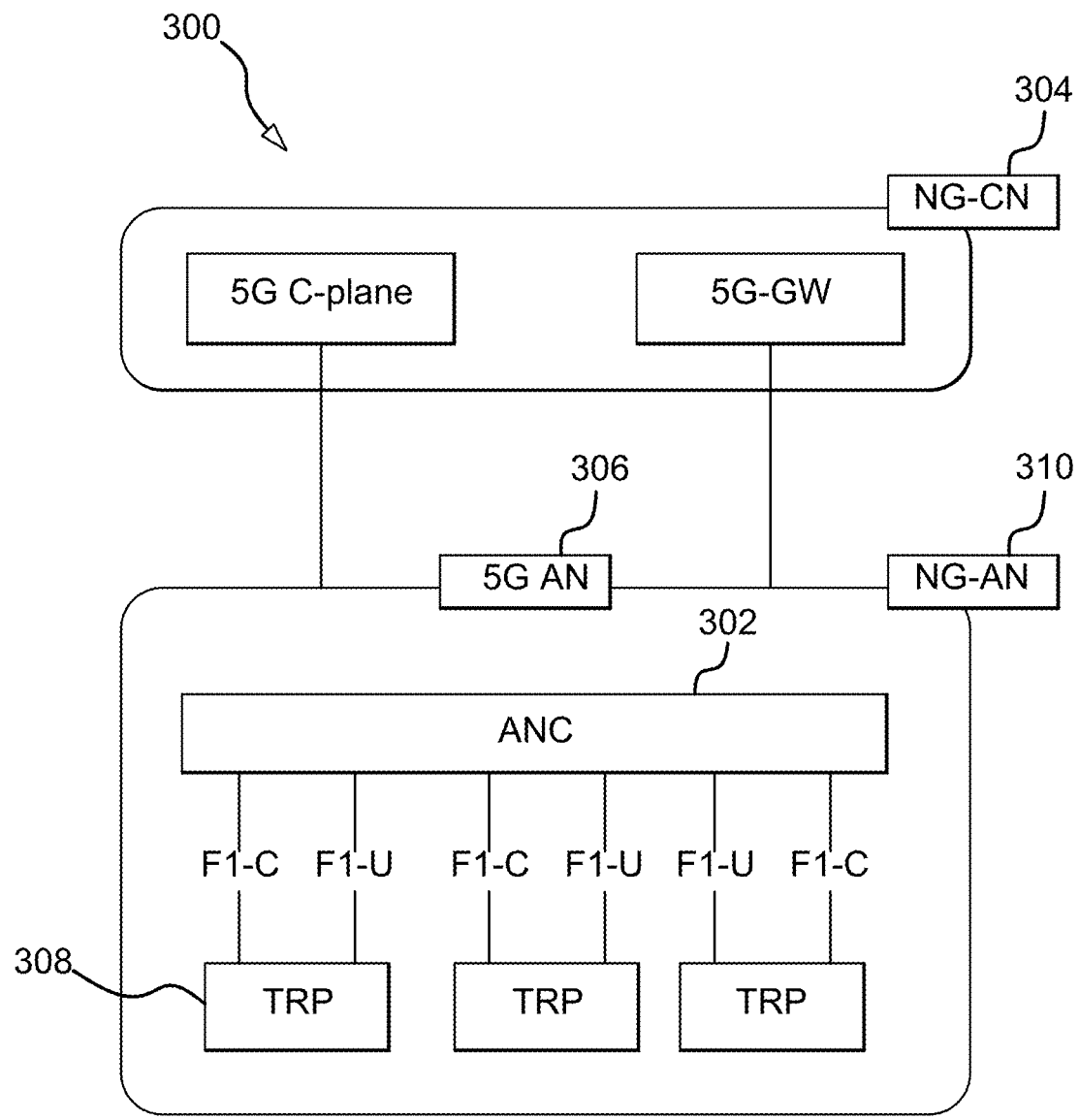
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
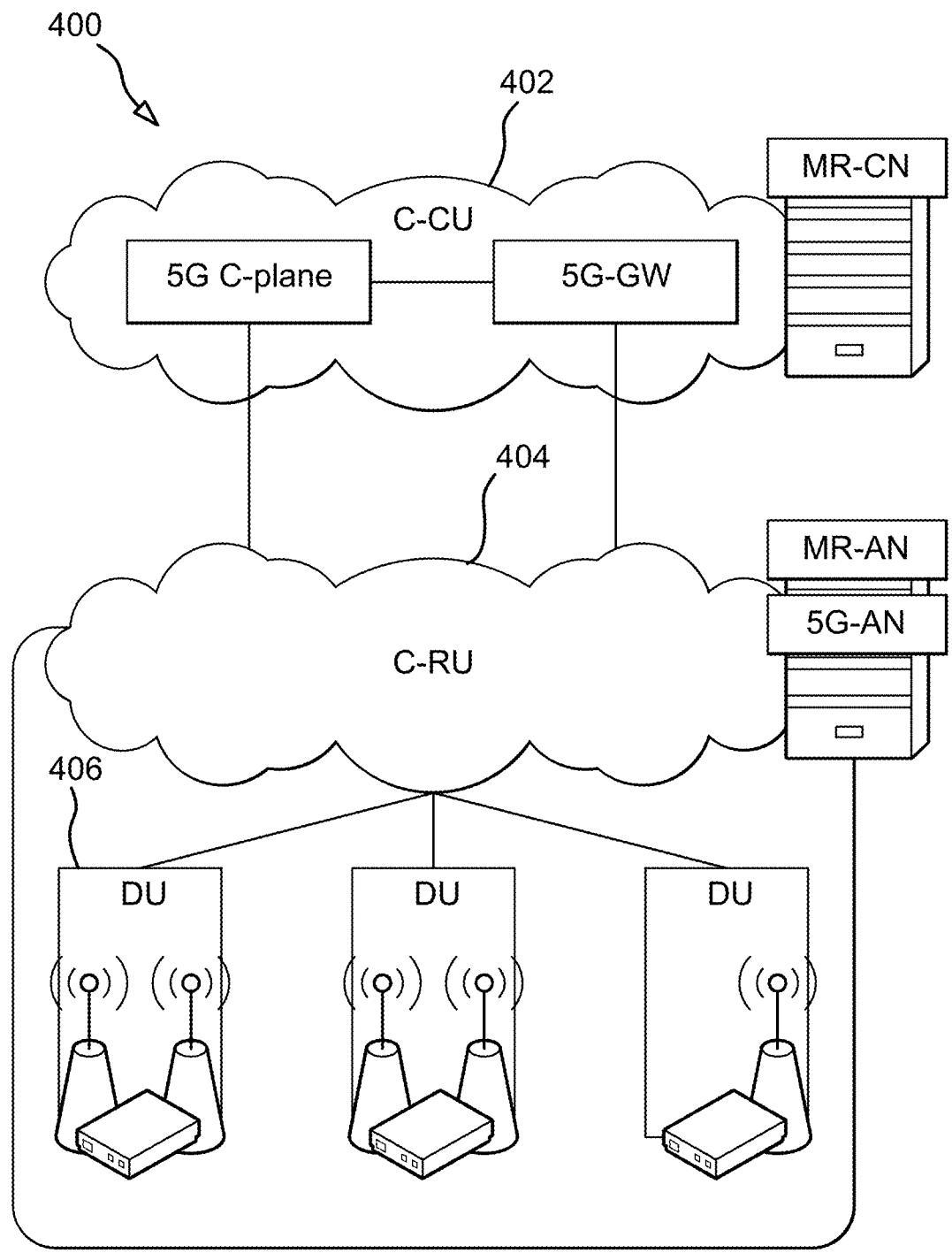
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5A:
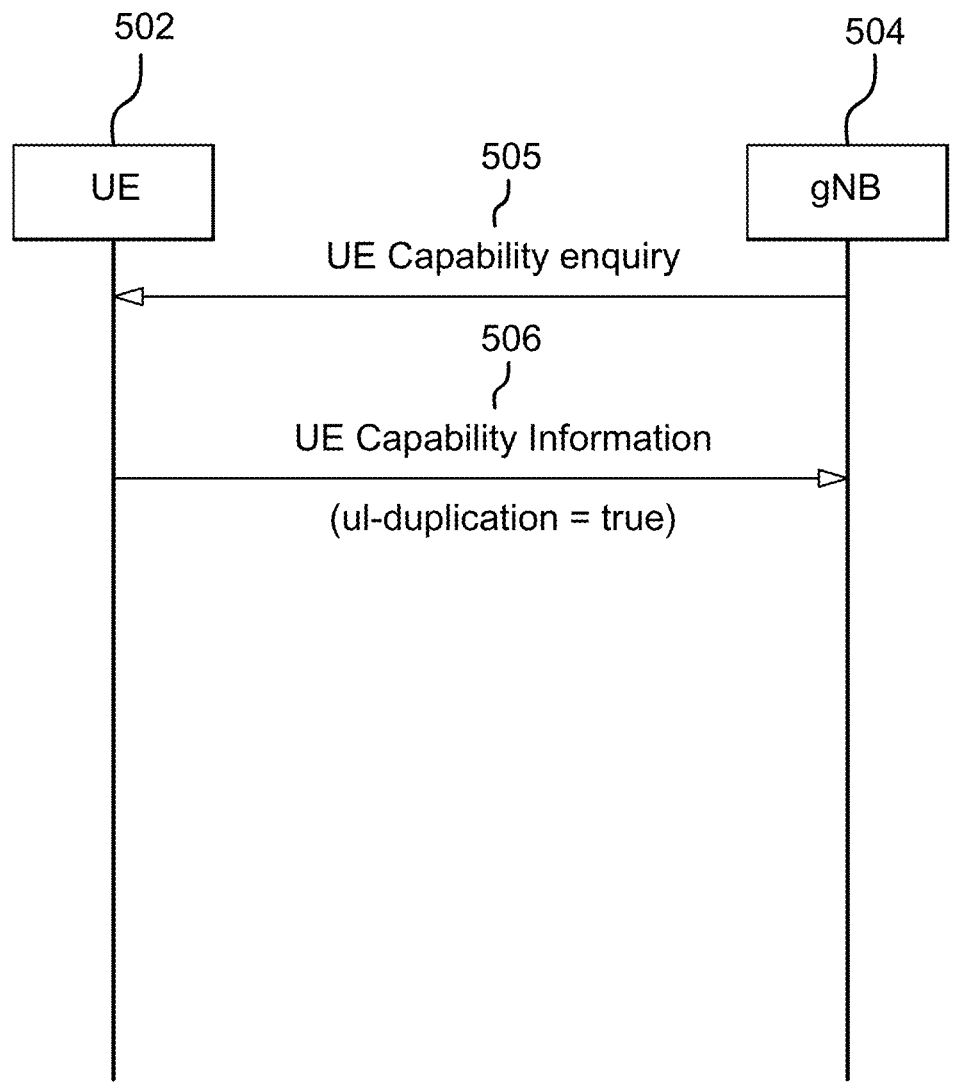
FIGS. 5A and 5B are diagrams illustrating communications between a UE and a base station to configure and activate the duplication architecture.
Figure 5B:
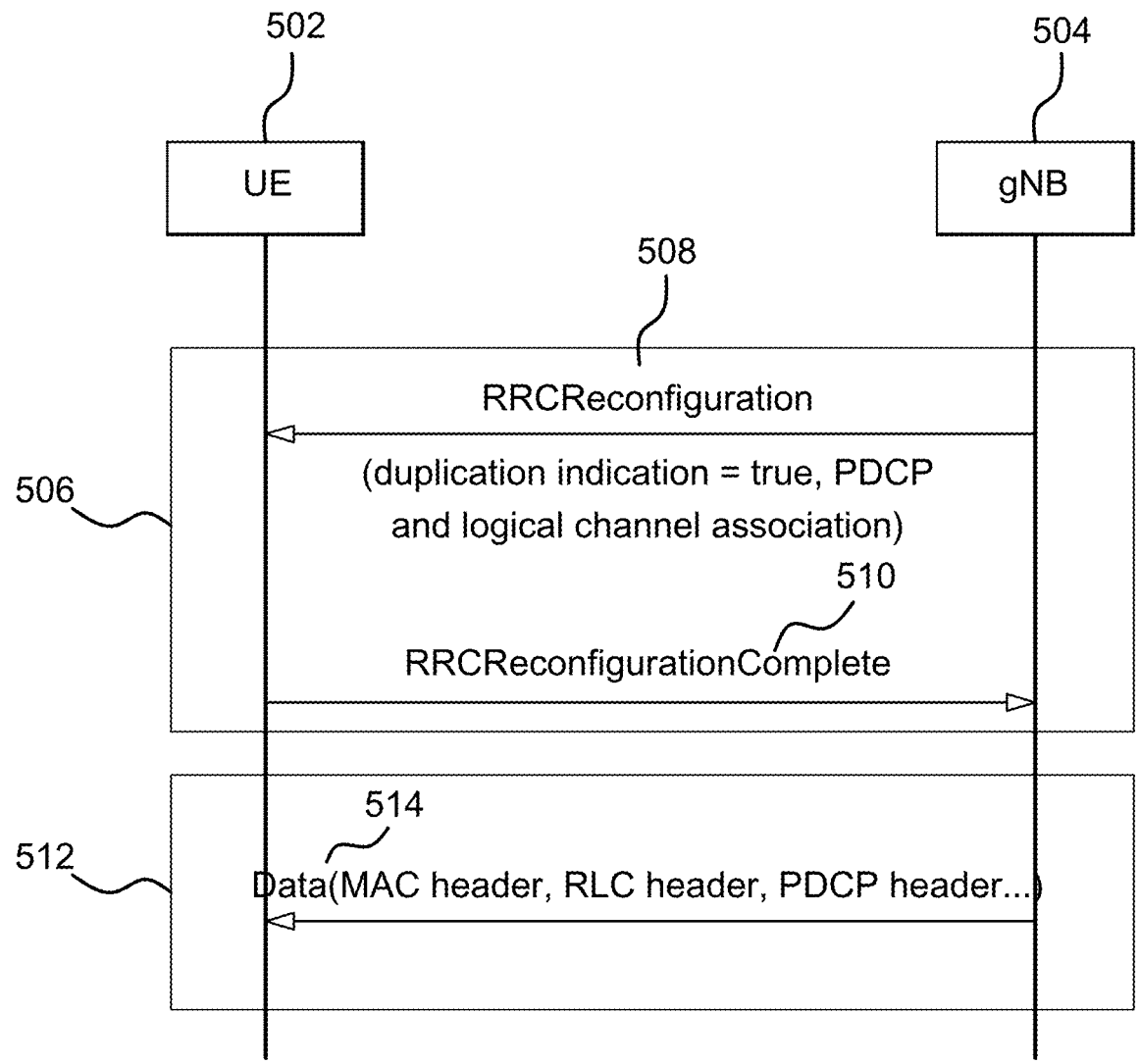

FIGS. 5A and 5B are diagrams illustrating communications between a UE and a base station to configure and activate the duplication architecture. 5G RAN, just like UMTS, allows for an explicit query of the capability of a UE. A RNC sends a "UE capability enquiry" message 505, via the base station (gNB) 504, to the UE 502 and receives in response a "UE capability information" message 506 from the UE 502, as shown in FIG. 5A. UE capability may include, for example, PDCP capability (such as the type of duplication supported), RLC capability (maximum RLC AM window size, max number of AM entities, etc.), Transport channel capability (max number of channels, received bits, RF capability FDD/TDD (supported bands, UE power class, Tx/Rx frequency separation), Physical channel capability (max number of codes, SF, received bits), UE multi-mode/multi-RAT capability (support of GSM, multi-carrier), Security capability (ciphering/integrity algorithm supported), Measurement capability (need for compress mode for GSM, multi-carrier measurements) and UE positioning capability. UE capability also includes inter-RAT UE radio access capability, such as GSM and GERAN capabilities.

FIG. 5B illustrates communications between the UE 502 and base station 504 to configure the duplication architecture. In one embodiment, the base station 504 may send an RRC connection reconfiguration message 508, (which may include duplication activation/deactivation indicator, session management configuration and PDCP and logical channel associations), to the UE 502 to set up 506 the duplication architecture. The RRC connection reconfiguration message 508 may contain all of the configuration parameters for the radio interface. This is for the configuration of Layer 2 (e.g., PDCP, RLC and MAC) parameters and also the Layer 1 parameters for the UE 502 to initialize the protocol stack. The UE 502 may then generate the corresponding response messages, e.g., an RRC connection reconfiguration complete message 510, to confirm that the bearers and the duplication architecture have been set up correctly.

FIG. 5B further illustrates dynamic activation 512 of the PDCP duplication using MAC protocol data units (PDUs) 514 transmitted from the base station 504 to the UE 502 at MAC sublayer. As discussed in greater detail below, MAC PDUs 514 contain MAC header information, RLC header information, PDCP header information, etc. In one embodiment, the MAC header may include a particular field, such as a MAC Control Element (CE), that may be used to dynamically activate/deactivate PDCP duplication functionality.

Figure 6A:
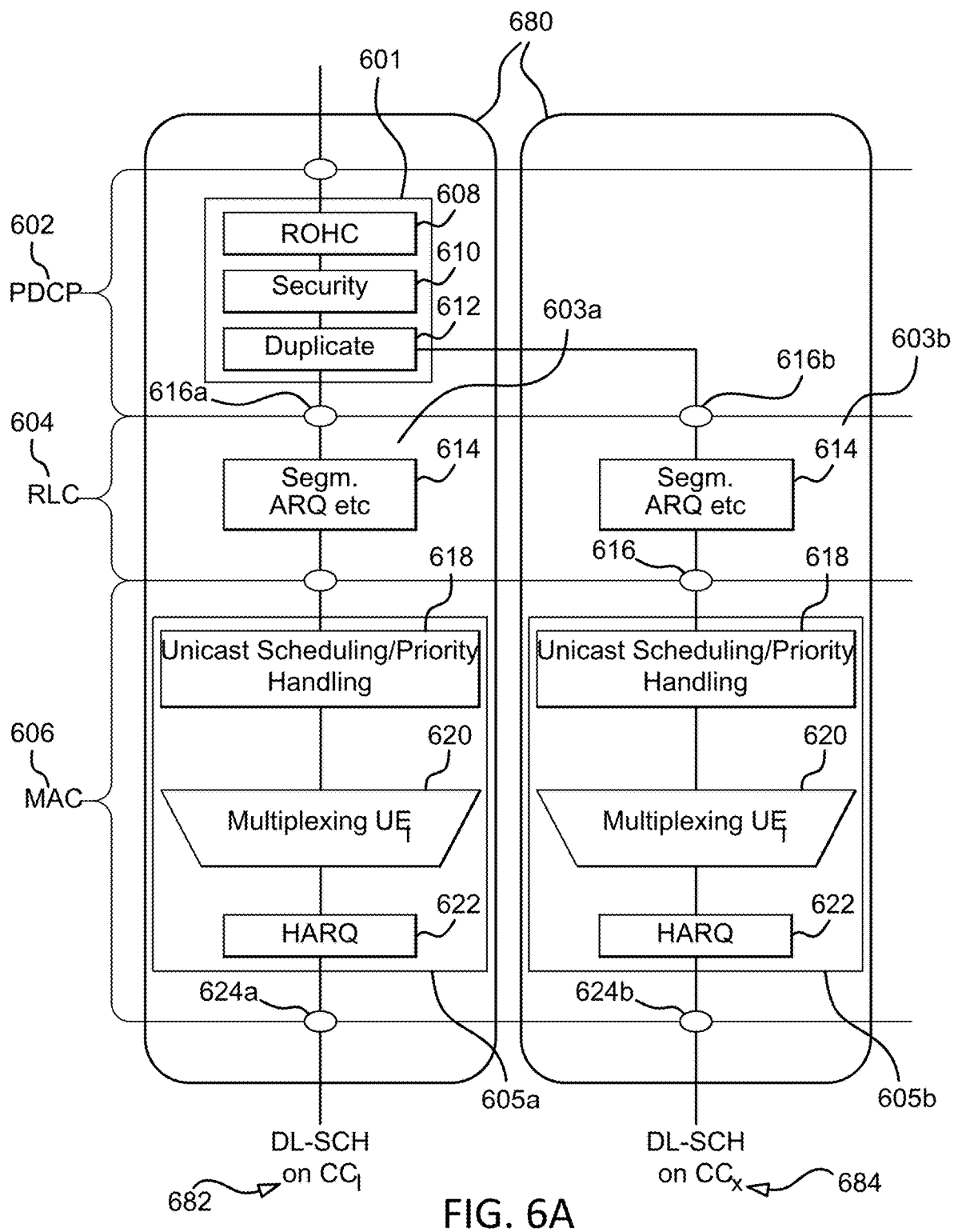
FIGS. 6A and 6B are diagrams showing examples of PDCP duplication realization of carrier aggregation using either separate or single MAC entities, respectively.
Figure 6B:
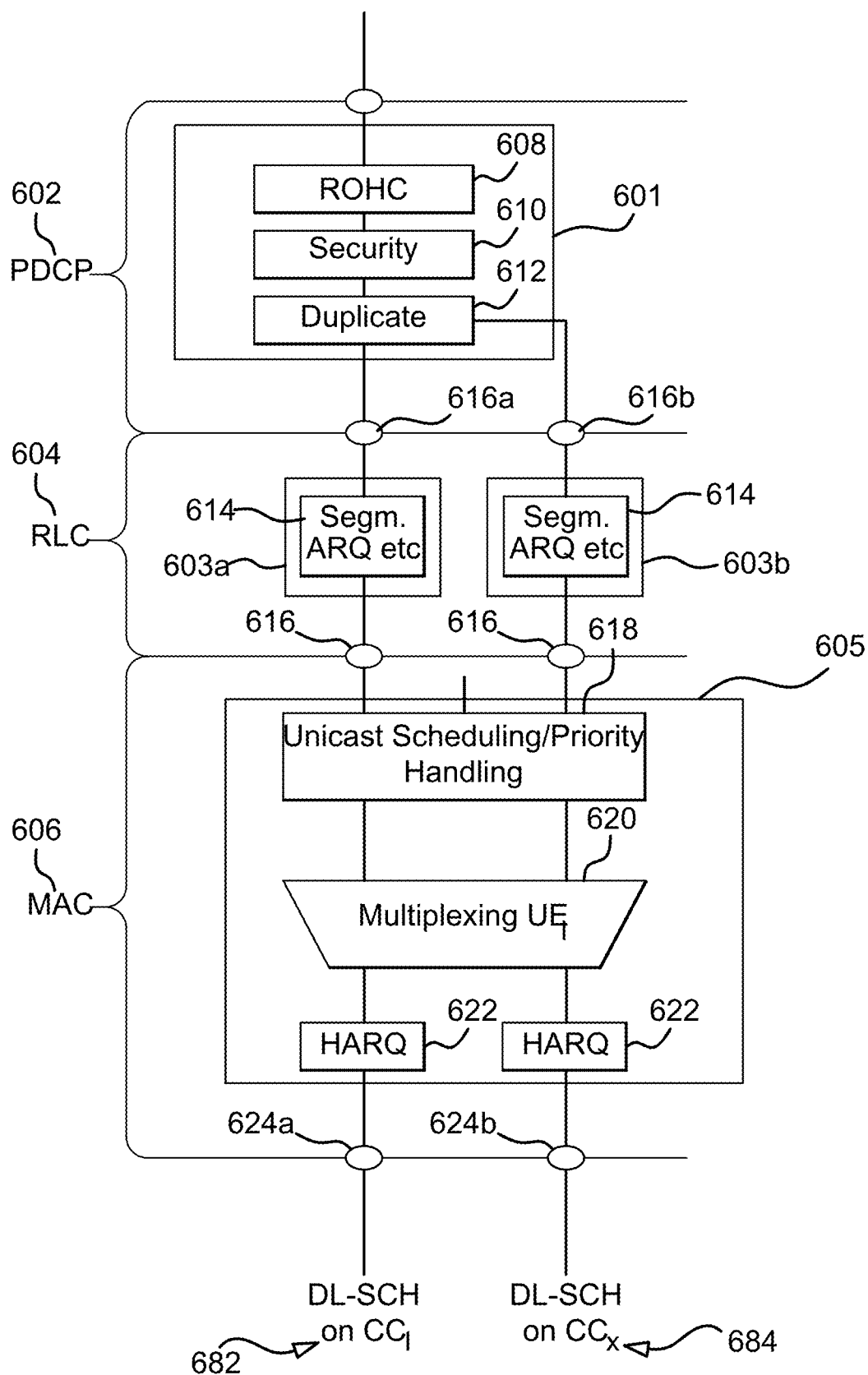

FIGS. 6A and 6B are diagrams showing examples of PDCP duplication realization of carrier aggregation using either separate or single MAC entities, respectively. Generally, when the UE 502 is in a transmit mode, upper layer packets may be provided to the PDCP sublayer 602 in the form of PDCP SDUs. The PDCP sublayer 602 assembles the PDCP SDUs into the PDCP PDUs. Each PDCP PDU includes a PDCP header and a PDCP payload. The PDCP payload may be used to carry PDCP SDUs. The PDCP PDUs may then be provided to the RLC sublayer 604.

At the RLC sublayer 604, the PDCP PDUs, or RLC SDUs, are assembled into RLC PDUs. Each RLC PDU includes an RLC header and an RLC payload. The RLC payload may be used to carry RLC SDUs. The RLC PDUs may then be provided to the MAC sublayer 606.

At the MAC sublayer 606, the RLC PDUs, or MAC SDUs, are assembled into MAC PDUs. Each MAC PDU includes a MAC header and a MAC payload. The MAC payload may be used to carry RLC SDUs. The MAC PDUs may then be provided to the physical layer (not shown).

In the communication between the UE 502 and the base station 504 it is important to use the resources effectively. Therefore, a header compression technique called ROHC (RObust Header Compression) is used to compress the header of each packet. In the ROHC 608, a header of user data accommodated in a payload of the PDCP payload is dynamically compressed. Security parameters utilized by various security functions 610 are also loaded into the PDCP sublayer 602 because security is performed at the PDCP sublayer 602.

It should be noted that PDCP PDU duplication may be desirable at least for multi-connectivity and carrier aggregation purposes. Specifically, PDCP duplication is advantageous if high reliability and low latency are required. As used herein, the terms "PDCP duplication" and "PDCP PDU duplication" refer to duplication of lower layer SDUs. Thus, in addition to security functions 610 various duplication functions 612 are also provided by the PDCP sublayer 602. Various duplication functionality parameters may include indicators/triggers to be utilized by the various PDCP functions such as, mapping, reordering and/or duplicate detection and/or any other PDCP function available in the RAN environment.

The RLC sublayer 604 supports at least three types of data transmission modes: Acknowledge Mode (AM), Unacknowledged Mode (UM) and Transparent Mode (TM). For AM, automated retransmit request (ARQ) is used for retransmissions. ARQ can also be used for status report signaling and for resetting the transmitting and receiving RLC entities. The RLC sublayer 604 also supports segmentation and concatenation of RLC SDUs. When an RLC PDU does not fit entirely into a MAC SDU, the RLC SDU will be segmented into variable sized RLC PDUs, which do not include any padding. Re-segmentation of PDUs can be performed when a re-transmitted PDU does not fit into a MAC SDU. The number of re-segmentations is unlimited. SDUs and segments of SDUs are concatenated into PDUs.

As shown in FIG. 6A, the RLC sublayer 604 includes various ARQ and segmentation functions 614, among others.

The MAC sublayer 606 supports functions that include but are not limited to the establishment of broadcast/unicast data/message transmission, and scheduling signaling 618. Another major function of the MAC sublayer 606 is logical channel multiplexing 620. The MAC sublayer 606 multiplexes several logical channels into one transport channel, so that a multiplexing gain is attained. Multiplexing gain is significant for intermittently transmitted traffic, such as signaling information or packet data. The channel mapping and logical channel multiplexing functions 620 of the MAC sublayer 606 are advantageous in increasing both the flexibility of channel selection and the efficiency of channel resources.

While the ARQ provides error correction by retransmission of unsuccessfully delivered packets at the RLC sublayer 604, the HARQ 622 ensures successful delivery at layer 1 and the MAC sublayer 606. HARQ 622 is based on ACK/NACK feedback that positively or negatively acknowledges whether an HARQ PDU has been correctly received or not.

Although PDCP duplication can be enabled by means of different alternatives, PDCP duplication is often established by creating duplicate bearers. In one embodiment, based on the RRC connection reconfiguration message 508, the UE 502 may set up a split bearer 680 having a first logical channel 616a on a first component carrier 682 and a second logical channel 616b on a second component carrier 684. In certain configurations, the UE 502 may associate one PDCP entity 601 to both the first logical channel 616a and the second logical channel 616b. FIG. 6A illustrates a PDCP entity 601 located in the PDCP sublayer 602. The PDCP entity 601 carries the data of the split bearer 680. As noted above, the PDCP sublayer 602 may support a duplication function 612 for the split bearer 680. In particular, as illustrated in FIG. 6A, when the duplication function 612 is activated, the PDCP sublayer 602 duplicates packets (e.g., PDCP PDUs) and transmits the duplicate packets to RLC/MAC entities of different carriers. More specifically, the UE 502 employs a first RLC entity 603a at the RLC sublayer 604 and a first MAC entity 605a at the MAC sublayer 606, and delivers data associated with the first logical channel 616a to a first transport channel 624a via the first RLC entity 603a and the first MAC entity 605a. In addition, the UE 502 employs a second RLC entity 603b at the RLC sublayer 604 and a second MAC entity 605b at the MAC sublayer 606, and delivers a duplicate packet via a second logical channel 616b to a second transport channel 624b via the second RLC entity 603b and the second MAC entity 605b. In this embodiment, the first transport channel 624a is associated with the first component carrier 682, while the second transport channel 624b is associated with the second component carrier 684.

On the other hand, FIG. 6B is a diagram showing an example of PDCP duplication realization of carrier aggregation using a single MAC entity. In this case, the UE 502 employs a single PDCP entity 601, RLC entities 603a, 603b, and a single MAC entity 605. In this case the PDCP entity 601 is configured to send duplicate packets to different logical channels 616a and 616b. Furthermore, the MAC entity maps the first logical channel to the first transport channel 624a and maps the second logical channel 616b to the second transport channel 624b. Just like in FIG. 6A, the first transport channel 624a is associated with the first component carrier 682 while the second transport channel 624b is associated with the second component carrier 684.

Embodiments of the present invention described below are directed to various techniques for activating/deactivating PDCP duplication function. In various embodiments, the UE 502 is configured to activate and perform PDCP duplication in response to receiving an activation signal from a base station.

In certain configurations, the UE 502 automatically configures and activates PDCP duplication functionality on a per radio bearer basis in response to receiving RRC message (e.g., RRC Connection Reconfiguration message 508) from the base station 504 requesting to establish a duplicated bearer. In other words, the UE 502 may start PDCP duplication function in a radio bearer which has been established as a duplicated bearer. The RRC Connection Reconfiguration message 508 includes a set of parameters associated with the first logical channel 616a and the second logical channel 616b. The UE 502 can set up the first logical channel 616a and the second logical channel 616b in accordance with the set of parameters. Further, the RRC Connection Reconfiguration message 508 include an indication to activate the duplication function 612. Therefore, in response to detecting that indication, the UE 502 activate the duplication function 612 upon setting up the first logical channel 616a and the second logical channel 616b.

Figure 7:
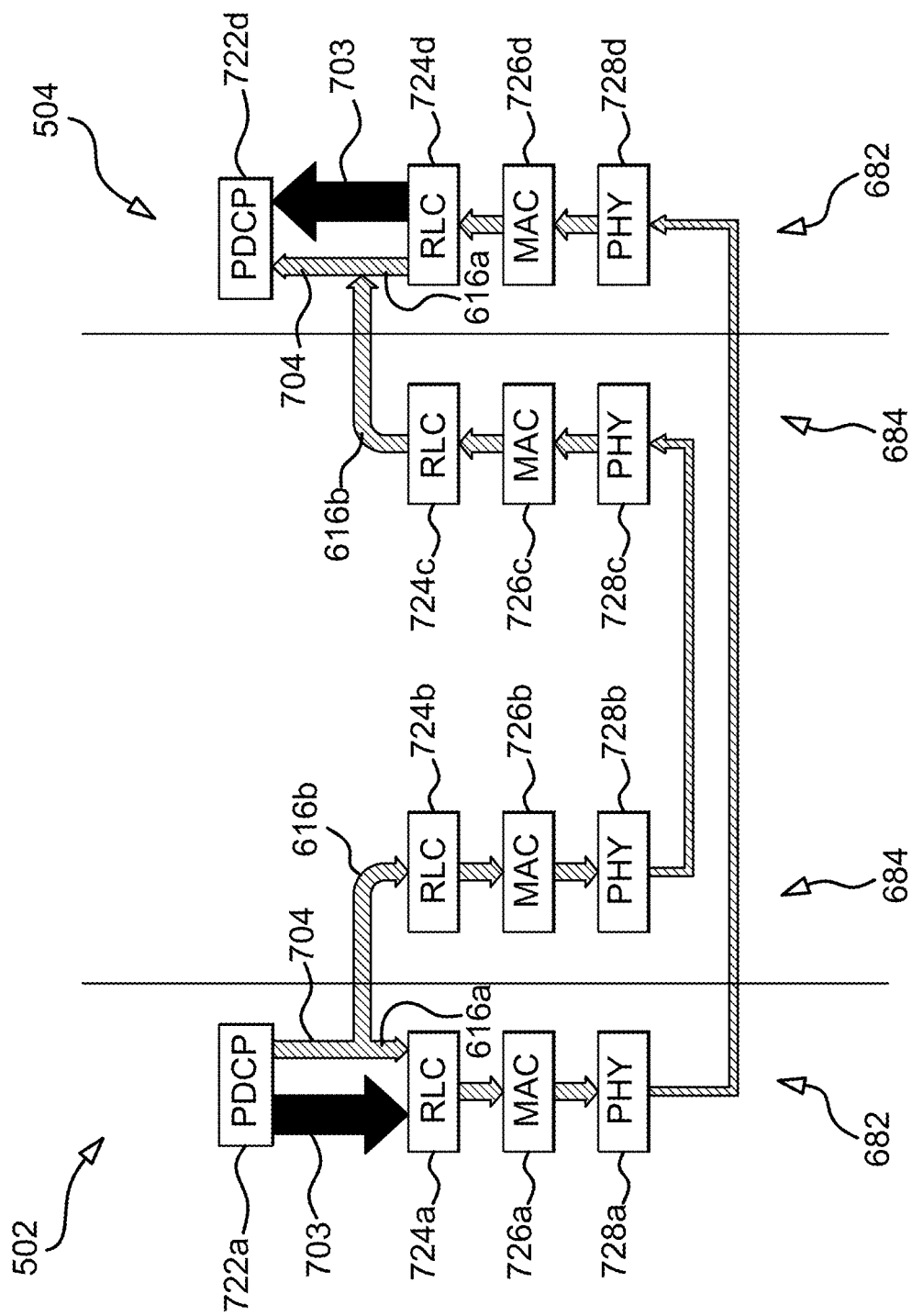
FIG. 7 is a diagram showing an example of data duplication restricted to one of the duplicated radio bearers.

FIG. 7 is a diagram showing an example of data duplication restricted to one of the duplicated radio bearers in a 5G system. Compared to existing 4G systems, 5G systems are expected to support more diversified services. For example, representative services may include enhanced mobile broad band (eMBB), ultra-reliable and low latency communication (URLLC), massive machine type communication (mMTC), and evolved multimedia broadcast/multicast service (eMBMS).

FIG. 7 illustrates that the UE 502 transmits data to the gNB 504 under eMBB and URLLC simultaneously. The UE 502 employs a PDCP layer 722a, a first RLC layer 724a, a first MAC layer 726a, and a first PHY layer 728a for communicating on the first component carrier 682. The UE 502 employs a second RLC layer 724b, a second MAC layer 726b, and a second PHY layer 728b for communicating on the second component carrier 684. The gNB 504 a PDCP layer 722d, a first RLC layer 724d, a first MAC layer 726d, and a first PHY layer 728d for communicating on the first component carrier 682. The gNB 504 employs a second RLC layer 724c, a second MAC layer 726c, and a second PHY layer 728c for communicating on the second component carrier 684. It should be noted that in this case not necessarily all data being transferred requires the advantage provided by PDCP duplication. Therefore, from resource allocation perspective, advantageous implementation restricts data duplication only to data that truly needs it. URLLC data transmitted between the UE 502 and the gNB 504 share similar characteristics, such as high reliability and low latency, leading to similar QoS requirements. As a result, URLLC data is typically transmitted over the same radio bearer between the UE 502 and the gNB 504. Due to the QoS requirements of the radio bearer, URLLC data may not share a radio bearer with eMBB data. To exploit the advantage of data duplication, the illustrated embodiment enables duplication on a per radio bearer basis. More specifically, as illustrated in FIG. 7, the UE 502 transfers eMBB data to the gNB 504 through a first radio bearer 703 on the first component carrier 682. The UE 502 transfers URLLC data to the gNB 504 through a second radio bearer 704, which is a split bearer having the first logical channel 616a on the first component carrier 682 and the second logical channel 616b on the second component carrier 684. When duplication function 612 is activated at the UE 502, the PDCP layer 722a duplicates a PDCP PDU, and transfers the PDCP PDU to the gNB 504 through the first logical channel 616a on the first component carrier 682 and transfers the duplicated PDCP PDU to the gNB 504 through the second logical channel 616b on the second component carrier 684. In certain configurations, the UE 502 may be configured to only duplicate URLLC data. The UE 502 may determine to activate duplication function 612 when receiving a corresponding RRC Connection Reconfiguration message 508 with an activation indication or based on the techniques described below.

When the UE 502 determines to deactivate the duplication function 612, in certain configurations, the UE 502 may use only one of the first logical channel 616a and the second logical channel 616b of the second radio bearer 704 to transmit data. For example, the PDCP layer 722a may transfer all PDCP PDUs through the first logical channel 616a. In certain configurations, the UE 502 may transfer different PCDP PDUs through the first logical channel 616a and the second logical channel 616b of the second radio bearer 704. For example, the PDCP layer 722a may transfer all a first PDCP PDU through the first logical channel 616a and a second, different PDCP PDU through the first logical channel 616b.

In addition to the establishment of a duplicated bearer, other configurations contemplate employment of other indicators for explicit activation of PDCP duplication functionality. It should be noted that PDCP duplication over multiple carriers described herein provides significant benefit when the UE 502 operates in low signal to noise ratio (SNR) channel conditions. However, when the UE 502 operates in good channel conditions, PDCP duplication functionality consumes substantially more valuable network resources (some of which may be wasted) than if transmission were to take place over a single link. Accordingly, embodiments of the present invention enable dynamic indicators for activation and deactivation of PDCP duplication, based on changing channel conditions, to reduce wasteful consumption of valuable network resources.

In some configurations, dynamic indicators for activation/deactivation of PDCP duplication may be reported to the UE 502 in a new MAC Control Element or appended in the extended power headroom MAC Control Element (CE) included in a MAC PDU. It should be noted that granularity of enabling PDCP duplication and activation of PDCP duplication may be different in various configurations. For example, in one configuration, PDCP duplication may be enabled and configured in data radio bearers (DRB) level through RRC signaling and PDCP duplication may be activated through additional MAC CE.

In some configurations, PDCP duplication may be implicitly activated by a UE based on mobility events associated with signal qualities. For a wireless communication subsystem in UE (e.g. 502), in case of LTE, some example pre-processing signal qualities include RSRP (Reference Signal Received Power) and RSRQ (Reference Signal Received Quality). In case of UTRAN, some example pre-processing signal qualities include Common Pilot Channel (CPICH) RSCP (Received Signal Code Power), pilot Ec/NO, or path-loss. The above example pre-processing metrics may be average signal quality measured at the output of one or both of the antenna ports of the UE. If the UE has multiple receiving antennas, the measurements at one or both of the receiving antennas may be collected. In LTE, RSRP and RSRQ are measured based on cell-specific reference signals (CRS). RSRP measures the average received power over the resource elements that carry cell-specific reference signals within certain frequency bandwidth. RSRQ can indicate the quality of the received reference signal and can be expressed as ratio of two quantities. The numerator of RSRQ is the average received power per CRS resource element based on the CRS of antenna port 0 (the CRS of antenna port 1 could also be used if it can be reliably detected). The denominator of RSRQ is the average total received power per OFDM (Orthogonal Frequency Division Multiplexing) symbol over one resource block from all sources, including co-channel serving and non-serving cells, adjacent channel interference and thermal noise. The reference point of RSRP and RSRQ is the antenna connector of the UE and hence RSRP and RSRQ can be regarded as pre-processing metrics. RSRP and RSRQ can be used in both RRC idle and RRC connected modes. As a specific example, RSRP and RSRQ can be used in the procedure of cell selection and cell reselection in RRC idle mode in LTE. RSRP and RSRQ are also used in the RRC connected mode for the handover procedure.

The aforementioned mobility events are typically triggered as the UE moves closer to the cell edge and serve as early warnings to the base station 504 to prepare for a handover procedure. As the UE moves closer to the serving cell edge, it typically experiences poorer SNR signal conditions. As mentioned above, when SNR conditions are poor PDCP data duplication is preferred or advantageous.

Figure 8:
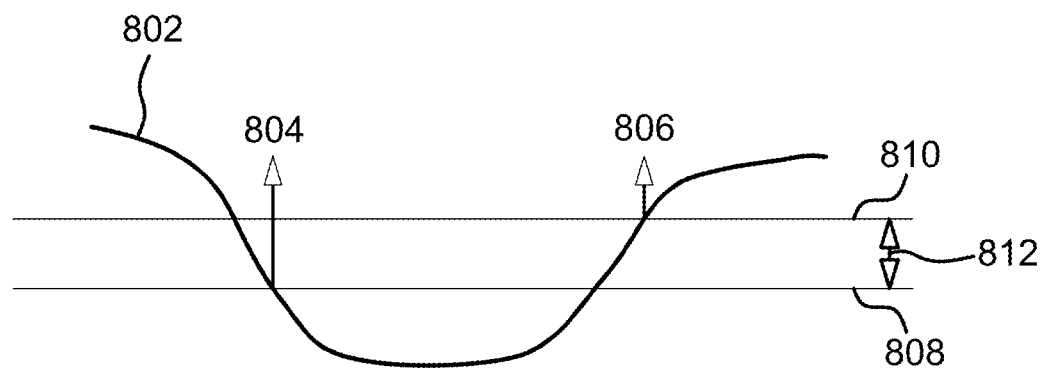
FIG. 8 is a graph that illustrates PDCP duplication triggered based on predefined measurement event thresholds.

FIG. 8 is a graph that illustrates PDCP duplication triggered based on measurement event thresholds. More specifically, FIG. 8 depicts filtered serving cell's signal quality measurement 802 that may be calculated based on one or more measurement reports provided by the measurement component 194. FIG. 8 also depicts exemplary predefined PDCP duplication trigger entry threshold 808 and PDCP duplication trigger exit threshold 810. The UE (e.g. 502) is capable of calculating hysteresis characteristics 812 based on the entry threshold 808 and the exit threshold 810. It should be noted that the entry threshold 808 and the exit threshold 810 may be dynamically adjusted by the base station 504 according to the serving cell's topology in the corresponding area being served. Accordingly, the base station 504 dynamically starts downlink PDCP duplication, in response to receiving from the measurement component 194 of the UE 502 measurement result indicating that the serving cell's signal quality measurement meets the PDCP duplication trigger entry threshold condition 804 (wherein the UE is connected to the serving cell). Furthermore, in response to determining that the serving cell's signal quality measurement meets the PDCP duplication trigger entry threshold condition 804, the UE 502 starts uplink PDCP duplication. Both the downlink and uplink PDCP duplication functionality is dynamically disabled by the base station 504 and UE 502, respectively, in response to determining that the serving cell's signal quality measurement meets the PDCP duplication trigger exit threshold condition 806.

Figure 9:
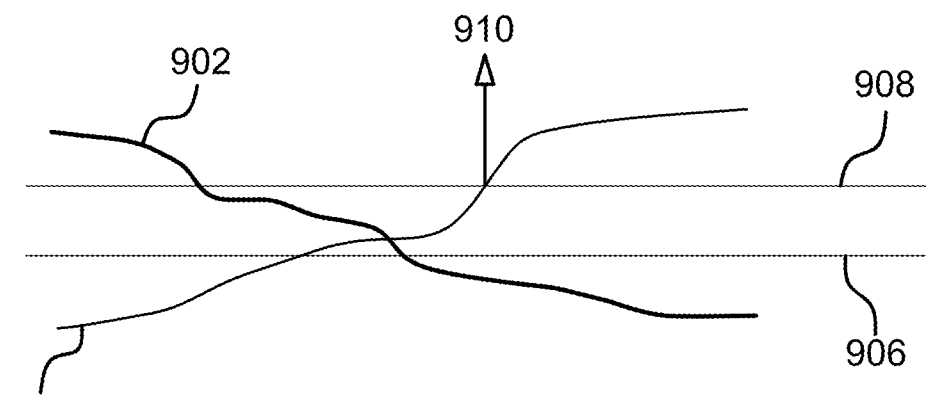
FIG. 9 illustrates graphs showing PDCP duplication triggered based on predefined measurement event thresholds associated with neighboring cell.

FIG. 9 illustrates graphs showing PDCP duplication triggered based on predefined measurement event thresholds associated with neighboring cell, according to another configuration. In this configuration, in addition to the filtered serving cell's signal quality measurement 902, the UE 502 may be keeping track of the neighboring cell's signal quality measurement 904. Both the serving cell's signal measurement 902 and the neighboring cell's measurement 904 may be calculated based on one or more measurement reports provided by the reporting component 194. In this case, if the UE 502 determines that the serving cell's signal quality 902 is below the predefined serving cell threshold 906 and determines that the neighboring cell's signal quality 904 is above 910 the predefined neighboring cell threshold 908 then the UE automatically enables PDCP duplication for an uplink signal associated with the neighboring cell. Similarly, if the aforementioned conditions are met, the base station (e.g., 504) associated with the neighboring cell dynamically starts downlink PDCP duplication. Advantageously, this configuration helps the UE 502 to improve data reliability when the UE operates within the communication cell edges of the cellular network. In this case, both the serving cells and the neighboring cells are configured for PDCP duplication.

The configurations discussed above contemplate utilization of RSRP and RSRQ measurement events for triggering PDCP duplication, however, the various configurations are not limited to these types of measurement events but can be used with other events as, for example, Radio Link Monitoring (RLM) measurement and power headroom measurement.

In certain configurations, the UE Layer 1 or the physical layer conducts RLM, for the purpose of detecting radio link failure (RLF) and radio link recovery. This is done by indicating a radio problem detection status or radio link quality to higher layers based on processing the cell-specific reference signal (CRS). In certain configurations, RLM may be based on TP-specific reference signals such as DeModulation Reference Signal (DMRS) or Channel State Information Reference Signal (CSI-RS). In non-Discontinuous Reception (non-DRX) mode operations, such as when the UE is not in sleep mode, the UE in every radio frame checks the quality, measured over a time period, against thresholds (also known Qout and Qin) defined implicitly by relevant requirements for detecting out-of-sync (OOS) and in-sync (IS) conditions, where "sync" means synchronization. For every radio frame, the UE indicates radio problem detection to higher layers when the quality is worse than the threshold Qout and continues monitoring until either (a) the quality gets better than the threshold Qin or (b) nRLF is declared (after a certain timer expires) and the radio link recovery procedure is initiated following the suspension of all UL transmissions. Typically, when the serving cell signal quality becomes bad, the UE may be handed over to another serving cell (based on measurements provided by the UE to the base station or network-aided measurements). However, for cases, e.g., where a UE is in a connected state to a serving cell, but the UE suddenly experiences severe sustained quality degradation and cannot receive any messages from the serving base station, the UE cannot be handed over to a different serving base station. In such cases, a radio link failure occurs and radio link recovery procedure is considered useful.

Similarly to the Qin and Qout thresholds, one or more RLM thresholds can be defined on a Block Error Rate (BLER) basis, for example. The BLER is estimated by the UE, typically by a cyclic redundancy check (CRC) of the data. This estimated BLER is compared to a target quality requirement, such as target BLER, representative of QoS requirements for the various types of data services on the channel. This target BLER may be used as a predefined threshold above which one step HARQ/ARQ over a single data link is efficient and below which threshold PDCP duplication over two data links results in better resource utilization. In other words, in this configuration, the UE 502 may automatically trigger uplink PDCP duplication in response to determining that the estimated BLER falls below the predefined threshold and may automatically stop uplink PDCP duplication function in response to determining that the estimated BLER is equal to or is above the predefined threshold.

In yet another configuration, power headroom may be used to estimate the UL channel quality at the UE and, accordingly may be used for triggering PDCP duplication. The UE 502 can report in a power headroom report the difference between the nominal maximum power and the power at the UE, e.g. the power that the UE would use if it did not apply maximum power limitations. This power headroom report describes the difference between nominal maximum transmission power and the currently used power. As the UL channel conditions deteriorate, the UE transmitter would be required to transmit at higher power levels to be heard by the base station's receiver. In this configuration, the UE 502 may automatically trigger uplink PDCP duplication in response to determining that the measured transmitter's power headroom falls below the predefined threshold and may automatically stop the uplink PDCP duplication function in response to determining that the measured power headroom is equal to or is above the predefined threshold.

According to other configurations, implicit activation for PDCP duplication may be based on loss and/or retransmissions of PDUs. Packet loss value is another indicator that could be used as a channel quality indicator. In one example, the packet loss value may be determined by the UE based on the order of the received PDU sequence numbers (SNs). Typically, if the packets arrive in order at the UE's receiver, it is unlikely that there are any issues with the downlink signal. However, as the SNR goes down and BLER estimate increases, PDUs start arriving out of order. For example, assume that the sequence number of the latest received PDU on a particular radio bearer (e.g., at RLC sublayer) is 'n'. If a downlink transport block (TB) decode fails, the SN of the next PDU that arrives at the RLC sublayer does not have the expected 'n+1' SN, but rather has the 'n+k' SN, where k is indicative of number of lost PDUs. It should be noted that the received PDUs can include HARQ-ACK information indicating correct or incorrect detection of data TBs in a physical channel. HARQ-ACK information can include a positive ACKnowledgement (ACK) in response to correct data TB detection, a Negative ACKnowledgement (NACK) in response to incorrect data TB detection, and an absence of physical channel detection (DTX) that can be implicit or explicit. A DTX could be implicit if a UE 502 does not transmit a HARQ-ACK signal. Generally, detecting out-of-order conditions is quite simple for a UE, as the UE's receiver only needs to maintain the sequence number of the latest received PDU.

Figure 10:
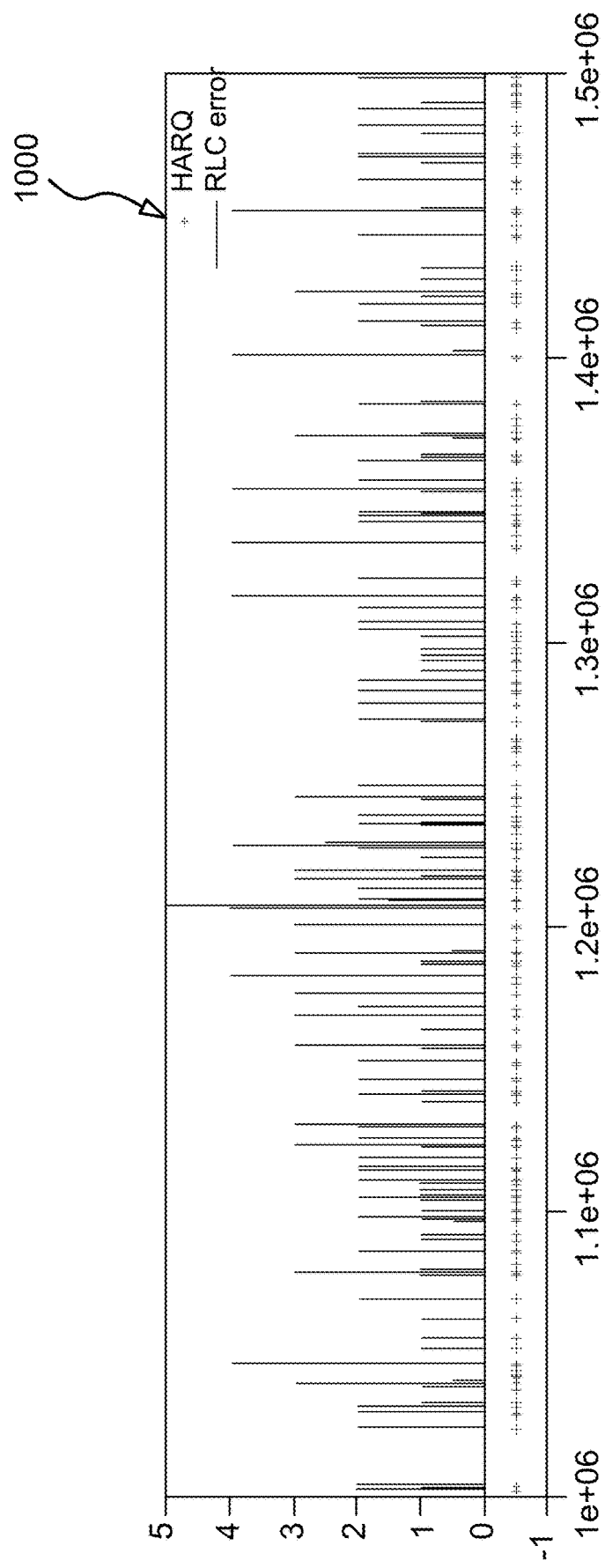
FIG. 10 is diagram illustrating correlation between Hybrid Automatic Repeat request Negative ACKnowledgements (HARQ NACKs) and RLC SN perturbations.

FIG. 10 is diagram illustrating correlation between HARQ NACKs and packet losses. FIG. 10 illustrates a plot 1000 of an RLC error counter against a retransmission counter which counts a number of retransmission of non-receiving packet HARQ NACKs reported by the UE 502. In this embodiment, the RLC error counter is incremented by the RLC sublayer of the UE 502 each time an RLC PDU is received with an out-of-order sequence number and the RLC counter is reset back to zero each time an RLC PDU is received which is in proper sequence order. As illustrated by the plot 1000, these out of sequence conditions correlate quite well with DL decode failures (evidenced by HARQ NACKs) and could be used as indication of the channel signal conditions experienced by the receiver of the UE 502.

As noted above, the RLC sublayer 604 supports at least three types of data transmission modes: AM, UM and TM. For example, for URLLC communications, if RLC UM/AM mode is used, sequence numbers associated with the RLC PDUs could be used by the UE 502 to detect channel conditions. On the other hand, if RLC TM mode is used, sequence numbers associated with the PDCP PDUs may be used by the UE 502 to detect channel conditions. In various configurations, one or more thresholds may be predefined based on detected out-of-sequence conditions described above. For example, in some configurations, the UE 502 may automatically trigger uplink PDCP duplication in response to determining that the detected out-of-sequence condition (packet loss counter) falls below the predefined threshold and may automatically stop the uplink PDCP duplication function in response to determining that the detected packet loss is above the predefined threshold.

It should be noted that various configurations discussed above contemplate one more preconfigured thresholds associated with a particular signal quality measurement. In yet another configuration, PDCP duplication functionality may be implicitly activated based on a threshold configured/provided by a base station. In this configuration, the base station 504 may configure one or more channel signal condition thresholds via SIB messages or dedicated RRC messages, such as an RRC reconfiguration message (e.g., an RRC connection reconfiguration message), which may include threshold information and radio bearer identifier(s) information. Upon receiving the threshold information, the UE 502 starts monitoring corresponding channel signal quality conditions. Once the conditions satisfying the provided threshold are met, the UE 502 automatically activates the PDCP duplication for the radio bearers that are identified for duplication (for example, in the corresponding message received from the base station 504). Similarly to the configurations described above the thresholds associated with signal quality measurements may include one or more of the following: measurements indicative of channel signal qualities (e.g., RSPR, RSRQ and the like), measurements associated with coding parameters (such as a modulation and coding scheme (MCS) or a channel quality indicator (CQI)), packet loss measurements (e.g., packet loss counter), various information associated with packet retransmissions (e.g., HARQ ACK/NACK counters, PDCP status report, RLC status report, and the like). At least in some configurations, the UE 502 may be configured to automatically activate PDCP duplication only when two or more threshold conditions are met.

In addition, some configurations contemplate utilization of UE assisted information, such as, but not limited to new UE measurement events indicative of channel signal conditions among different carriers to help the base station determine a need of PDCP duplication activation.

Figure 11:
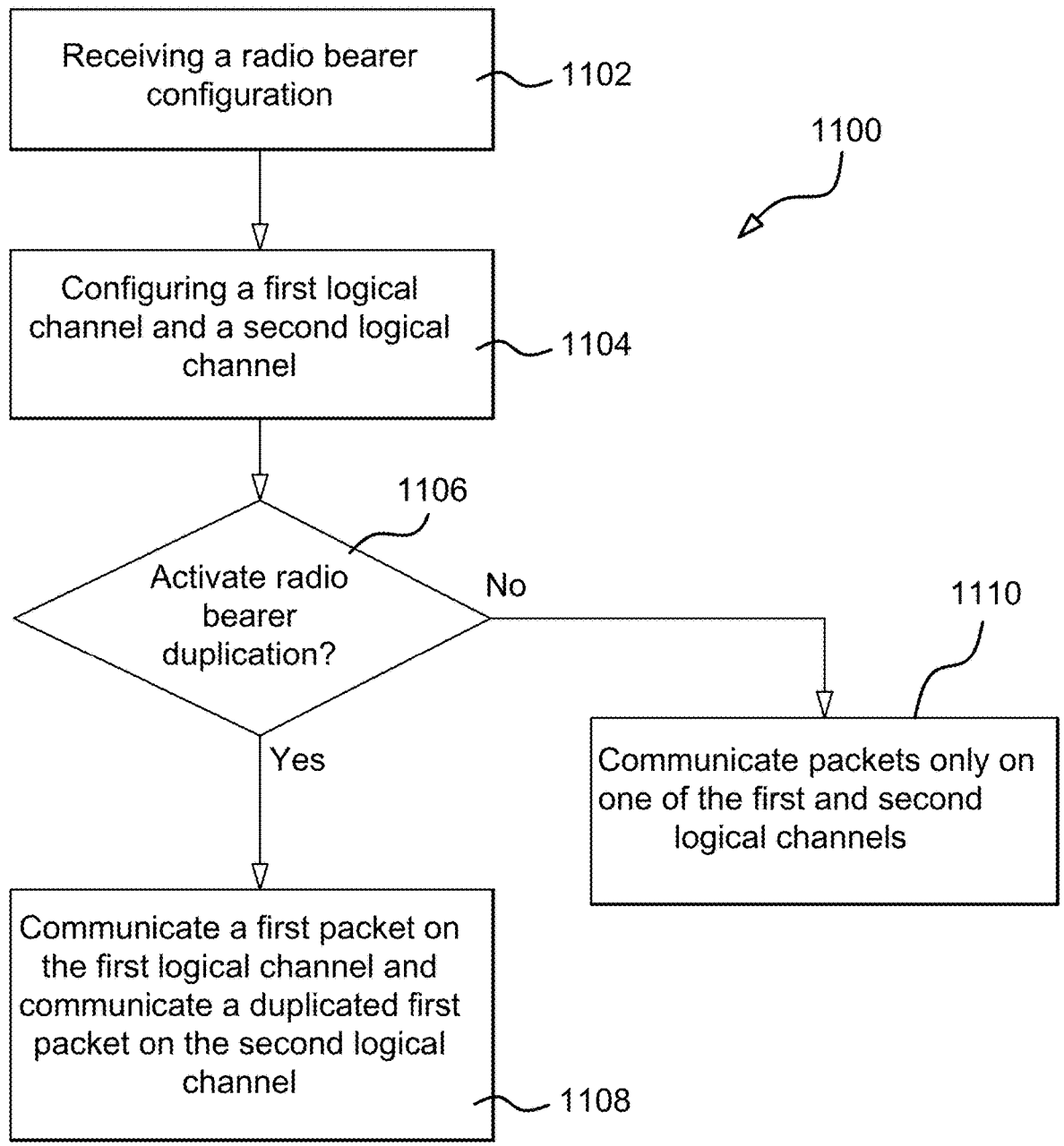
FIG. 11 is a flow chart 1100 of a method (process) for activating packet duplication.

FIG. 11 is a flow chart 1100 of a method (process) for activating packet duplication. The method may be performed by a UE (e.g., the UE 104, the UE 250,502, the apparatus 1302'). At operation 1102, the UE receives a radio bearer configuration (e.g., the RRC connection reconfiguration message 508). At operation 1104, the UE configures a radio bearer (e.g., the second radio bearer 704) based on the received radio bearer configuration. This operation includes configuring a first logical channel (e.g., the first logical channel 616*a*) on a first carrier (e.g., the first component carrier 682) and includes configuring a second logical channel (e.g., the second logical channel 616*b*) on a second carrier (e.g., the second component carrier 684). At operation 1106, the UE determines whether to activate radio bearer duplication (e.g., duplication function 612). At operation 1108, in response to a determination to activate the radio bearer to perform duplication (e.g. based on the received radio bearer configuration), the UE communicates a first packet (e.g., a PDCP PDU) on the first logical channel 616a and communicates a duplicated first packet (e.g., a duplicated PDCP PDU) on the second logical channel 616b. At operation 1110, in response to a determination not to activate the radio bearer to perform duplication (e.g. based on the received radio bearer configuration), the UE communicates all packets only on one of the first 616a and second 616b logical channels. Alternatively, the UE may communicate different (not duplicate) packets on the first 616a and second 616b logical channels, in response to a determination not to activate the radio bearer to perform duplication.

In certain configurations, the radio bearer configuration includes an activation indicator. In certain configurations, the determination whether to activate radio bearer duplication is made based on the activation indicator. In certain configurations, the radio bearer configuration is received via a RRC message.

In certain configurations, the determination whether to activate radio bearer duplication includes detecting an activation indicator and/or a deactivation indicator. In certain configurations, the determination to activate the radio bearer to perform duplication is made in response to detecting the activation indicator. In certain configurations, the determination to deactivate the radio bearer to not perform duplication is made in response to detecting the deactivation indicator.

In certain configurations, the activation indicator and/or deactivation indicator is/are contained in a MAC control element.

In certain configurations, the activation indicator and/or deactivation indicator are represented by a logical channel identifier included in the MAC control element.

In certain configurations, the first packet is a PDCP packet.

In certain configurations, communicating the first packet on the first logical channel and communicating the duplicated first packet on the second logical channel includes transmitting the first packet on the first logical channel in an uplink direction and transmitting the duplicated first packet on the second logical channel in the uplink direction.

In certain configurations, communicating the first packet on the first logical channel and communicating the duplicated first packet on the second logical channel includes receiving the first packet on the first logical channel in a downlink direction successfully, receiving the duplicated first packet on the first logical channel in the downlink direction successfully and discarding the duplicated first packet.

In certain configurations, the UE may also deactivate one of the first carrier and the second carrier in response to a determination not to activate the radio bearer to perform duplication and may switch at least one component of the UE operating the deactivated carrier to a power saving mode.

In certain configurations, switching the at least one component includes at least one of switching off a radio frequency (RF) transceiver operating the deactivated carrier; entering, by the at least one component, into a discontinuous reception (DRX) inactive state; and entering, by the at least one component, into a radio resource control (RRC) inactive state.

In certain configurations, the UE may also switch the at least one component to a normal mode from the power saving mode in response to a determination to activate the radio bearer to perform duplication.

Figure 12:
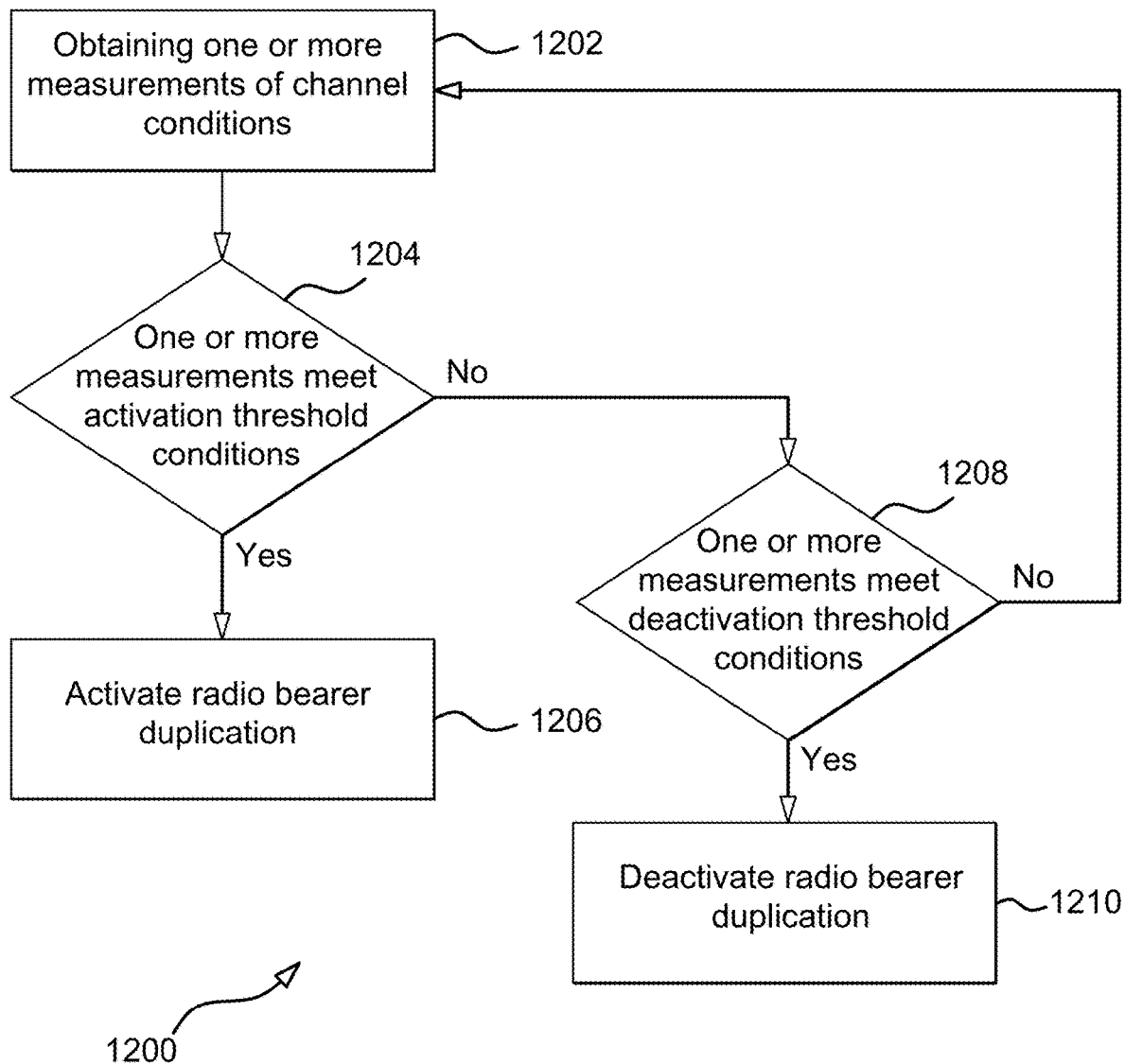
FIG. 12 is a flow chart 1200 of a method (process) for determining whether to activate the radio bearer to perform duplication.

FIG. 12 is a flow chart 1200 of a method (process) for determining whether to activate the radio bearer to perform duplication. The method may be performed by a UE (e.g., the UE 104, the UE 250, 502, the apparatus 1302'). At operation 1202, the UE obtains one or more measurements of channel conditions (e.g., one or more measurements of at least one of a RSRP measurement, RSRQ measurement, RLM measurement and a power headroom measurement). At operation 1204, the UE determines whether the one or more measurements meet activation threshold conditions (e.g., trigger entry threshold 808). At operation 1206, the UE activates the radio bearer to perform duplication (e.g., duplication function 612), in response to a determination that the one or more measurements meet activation threshold conditions. In certain configurations, the UE activates the radio bearer to perform duplication in an uplink direction, in response to a determination that the one or more measurements meet activation threshold conditions. At operation 1208, the UE determines whether the one or more measurements meet deactivation threshold conditions (e.g., exit threshold 810), in response to a determination that the one or more measurements do not meet activation threshold conditions. At operation 1210, the UE deactivates the radio bearer to perform duplication, in response to a determination that the one or more measurements meet deactivation threshold conditions.

In certain configurations, the one or more measurements of channel conditions include one or more measurements of channel quality indicator. In certain configurations, the one or more measurements of the channel quality indicator include at least one of a RSRP measurement, RSRQ measurement, RLM measurement and a power headroom measurement. In certain configurations, the activation threshold conditions and/or deactivation threshold conditions are received through a RRC message from a base station.

In certain configurations, obtaining one or more measurements of channel conditions includes obtaining one or more first measurements of a first channel condition in a first cell at the UE and obtaining one or more second measurements of a second channel condition in a second cell at the UE. In certain configurations, a determination to activate the radio bearer to perform duplication includes the determination to activate the radio bearer to perform duplication, in response to determining that the one or more first measurements meet one or more first threshold conditions and in response to determining that the one or more second measurements meet one or more second threshold conditions.

In certain configurations, obtaining one or more measurements of channel conditions includes obtaining one or more measurements of a transmission condition at the UE. In certain configurations, a determination to activate the radio bearer to perform duplication includes the determination to activate the radio bearer to perform duplication, in response to determining that the one or more measurements of the transmission condition meet one or more activation threshold conditions.

In certain configurations, the one or more measurements of the transmission condition measure at least one of a packet loss condition, a packet error rate, a physical channel BLER, a HARQ failure count, a RLC retransmission count, a count of missing packets based on PDCP sequence numbers.

Figure 13:
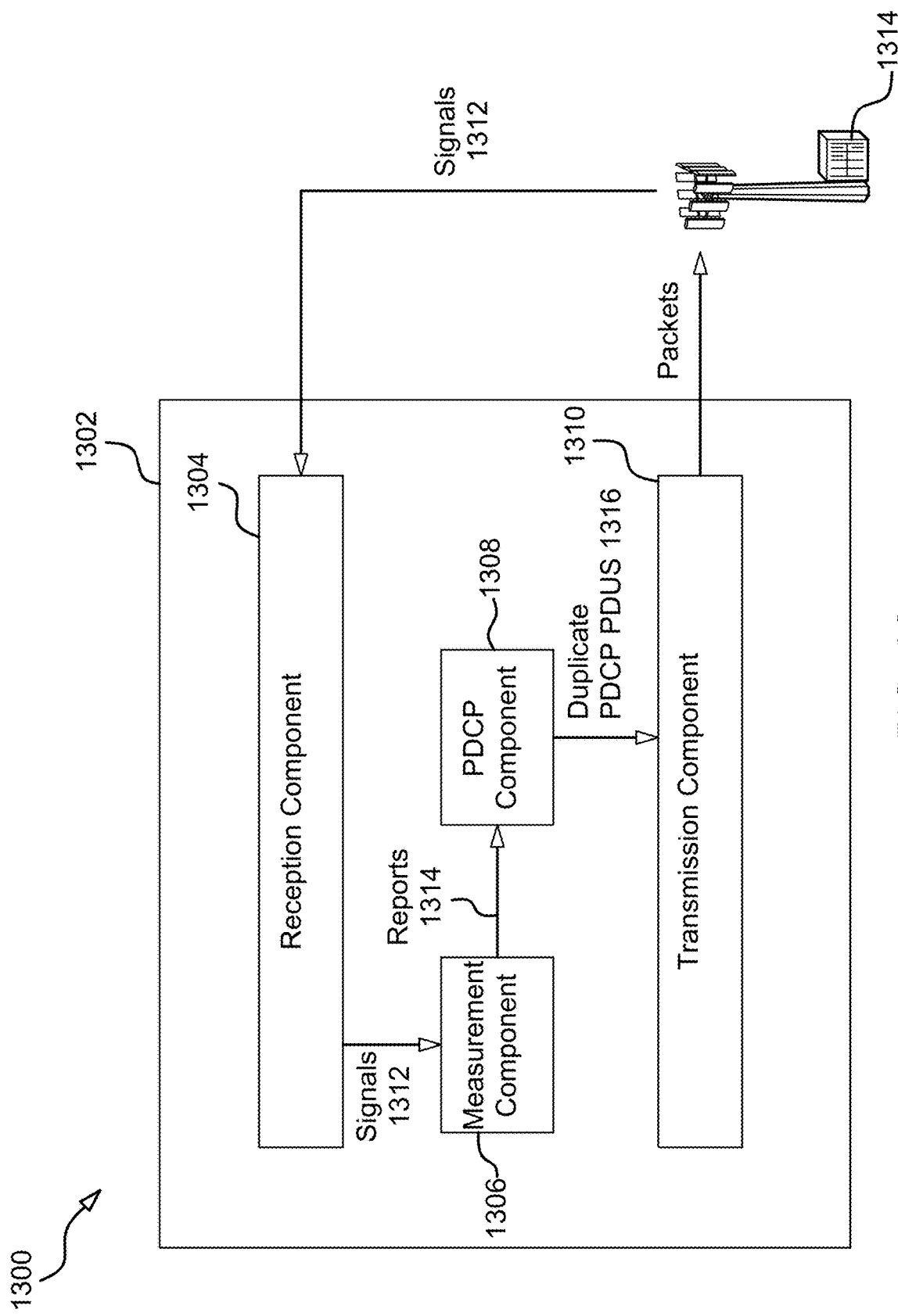
FIG. 13 is a conceptual data flow diagram illustrating the data flow between different components/means in an exemplary apparatus.

FIG. 13 is a conceptual data flow diagram 1300 illustrating the data flow between different components/means in an exemplary apparatus 1302. The apparatus 1302 may be a UE. The apparatus 1302 includes a reception component 1304, a measurement component 1306, a PDCP component 1308, and a transmission component 1310. The reception component 1304 may receive signals 1312 from a base station 1314.

In one configuration, the reception component 1304 sends the signals 1312 to the measurement component 1312. Based on the signals 1312, the measurement component 1306 performs measurements with respect to different channel signal quality indicators. In one configuration, the measurement component 1312 may be configured to determine whether the received signals 1312 include configuration messages (e.g., RRC reconfiguration messages) containing one or more thresholds. In another configuration, the measurement component 1312 may be configured to determine whether there exist any predefined thresholds with respect to different channel signal quality indicators. When the measurement component 1306 determines that quality metric of a downlink signal between the apparatus 1302 and the base station 1314 is below the provided (or predefined) threshold, the measurement component 1306 can indicate as much to the PDCP component 1308 (e.g., by transmitting a signal quality report to the PDCP component 1308 and indicating therein that the quality metric is below/above the threshold). The PDCP component 1308 can process the signal quality report and determine whether to activate/stop PDCP duplication functionality (assuming that conditions for activation/deactivation have been met). Once PDCP duplication is activated, the PDCP component 1308 duplicates packets (PDCP PDUs) and transmits the duplicate packets to different carriers using different logical channels through the transmission component 1310. The transmission component 1310 then transmits the duplicate packets (including the duplicate PDCP PDUs 1316) to one or more base stations 1314.

Figure 14:
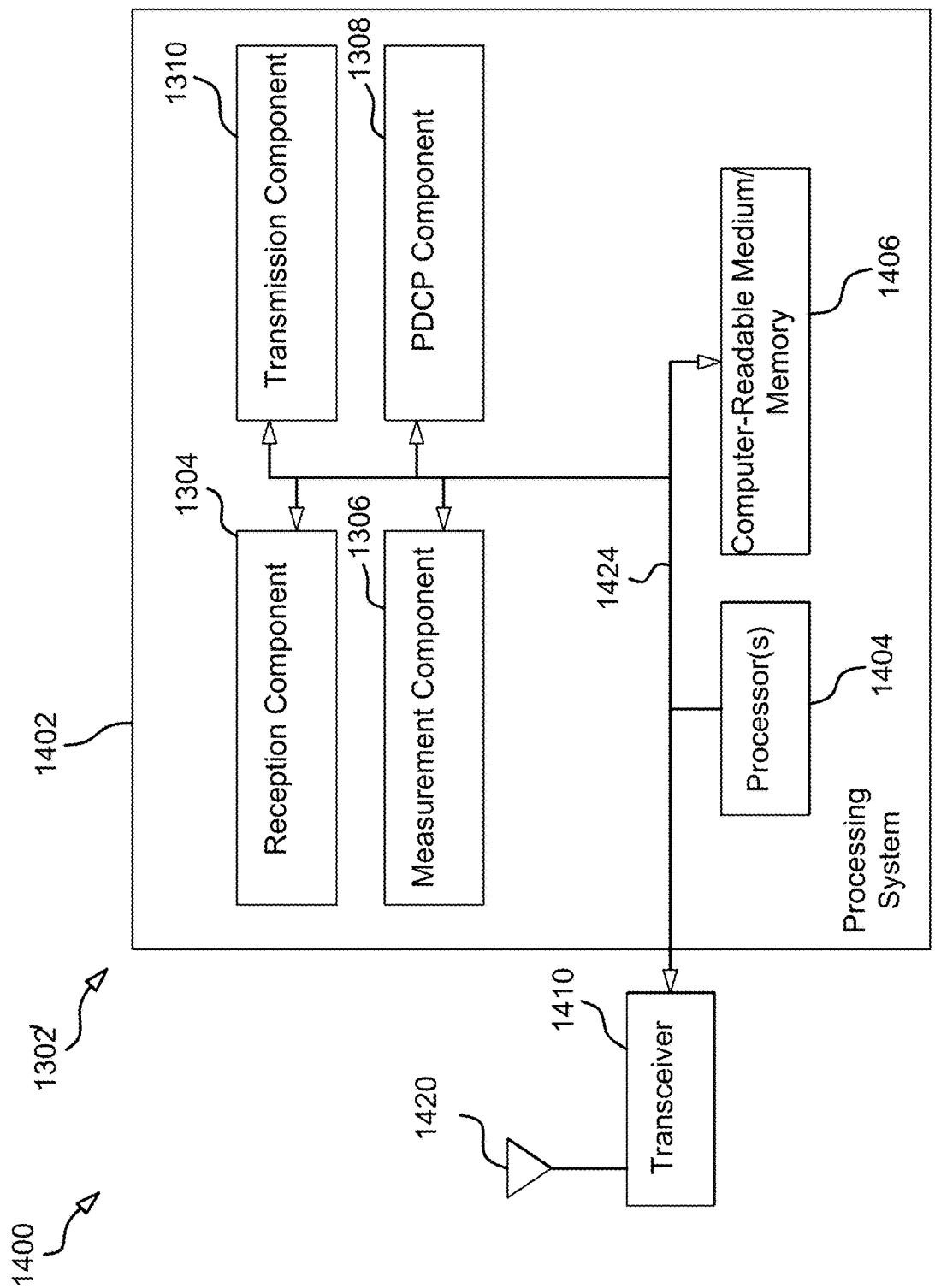
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The processing system 1402 may be implemented with a bus architecture, represented generally by a bus 1424. The bus 1424 may include any number of interconnecting buses and bridges depending on the specific application of the processing system 1402 and the overall design constraints. The bus 1424 links together various circuits including one or more processors and/or hardware components, represented by one or more processors 1404, the reception component 1304, the measurement component 1306, the PDCP component 1308, the transmission component 1310, and a computer-readable medium/memory 1406. The bus 1424 may also link various other circuits such as timing sources, peripherals, voltage regulators, and power management circuits, etc.

The processing system 1402 may be coupled to a transceiver 1410, which may be one or more of the transceivers 254. The transceiver 1410 is coupled to one or more antennas 1420, which may be the communication antennas 252.

The transceiver 1410 provides a means for communicating with various other apparatus over a transmission medium. The transceiver 1410 receives a signal from the one or more antennas 1420, extracts information from the received signal, and provides the extracted information to the processing system 1402, specifically the reception component 1304. In addition, the transceiver 1410 receives information from the processing system 1402, specifically the transmission component 1310, and based on the received information, generates a signal to be applied to the one or more antennas 1420.

The processing system 1402 includes one or more processors 1404 coupled to a computer-readable medium/memory 1406. The one or more processors 1404 are responsible for general processing, including the execution of software stored on the computer-readable medium/memory 1406. The software, when executed by the one or more processors 1404, causes the processing system 1402 to perform the various functions described supra for any particular apparatus. The computer-readable medium/memory 1406 may also be used for storing data that is manipulated by the one or more processors 1404 when executing software. The processing system 1402 further includes at least one of the reception component 1304, the measurement component 1306, the PDCP component 1308, and the transmission component 1310. The components may be software components running in the one or more processors 1404, resident/stored in the computer readable medium/memory 1406, one or more hardware components coupled to the one or more processors 1404, or some combination thereof. The processing system 1402 may be a component of the UE 250 and may include the memory 260 and/or at least one of the TX processor 268, the RX processor 256, and the communication processor 259.

In one embodiment, the apparatus 1302/apparatus 1302' for wireless communication includes means for performing each of the operations of FIGS. 11-12. The aforementioned means may be one or more of the aforementioned components of the apparatus 1302 and/or the processing system 1402 of the apparatus 1302' configured to perform the functions recited by the aforementioned means. As described supra, the processing system 1402 may include the TX Processor 268, the RX Processor 256, and the communication processor 259. As such, in one embodiment, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    receiving a radio bearer configuration;
    configuring, based on the radio bearer configuration, a radio bearer including a first logical channel on a first carrier and a second logical channel on a second carrier;
    determining whether to activate the radio bearer to perform duplication;
    communicating a first packet on the first logical channel and a duplicated first packet on the second logical channel in response to a determination to activate the radio bearer to perform duplication; and
    obtaining one or more measurements of a channel condition at the UE, wherein the determining whether to activate the radio bearer to perform duplication includes:
    determining to activate the radio bearer to perform duplication in an up-link direction in response to determining that the one or more measurements are in a predetermined relationship with one or more predetermined thresholds.

2. The method of claim 1, further comprising:
    communicating packets only on one of the first logical channel and the second logical channel or communicating different packets on the first logical channel and the second logical channel in response to a determination not to activate the radio bearer to perform duplication.

3. The method of claim 1, wherein the radio bearer configuration includes a set of parameters associated with the first logical channel and the second logical channel, wherein the determining whether to activate the radio bearer to perform duplication includes:
    determining to activate the radio bearer to perform duplication based on an activation indication included in the radio bearer configuration.

4. The method of claim 1, wherein the radio bearer configuration is received via a radio resource control (RRC) message.

5. The method of claim 1, wherein the determining whether to activate the radio bearer to perform duplication includes:
    detecting an activation indication or a deactivation indication;
    determining to activate the radio bearer to perform duplication in response to detecting the activation indication; and
    determining to deactivate the radio bearer to not perform duplication in response to detecting the deactivation indication.

6. The method of claim 5, wherein the activation indication or the deactivation indication is contained in a medium access control (MAC) control element.

7. The method of claim 6, wherein the activation indication or the deactivation indication is represented by a logical channel identifier included in the MAC control element.

8. The method of claim 1, wherein the one or more measurements of the channel condition include a channel quality indicator.

9. The method of claim 8, wherein the channel quality indicator indicates at least one of a Reference Signal Received Power (RSRP) measurement, a Reference Signal Received Quality (RSRQ) measurement, a Radio Link Monitoring (RLM) measurement, and a power headroom measurement.

10. The method of claim 1, wherein the one or more predetermined thresholds are received through a radio resource control (RRC) message from a base station.

11. A method of wireless communication of a user equipment (UE), comprising:
    receiving a radio bearer configuration;
    configuring, based on the radio bearer configuration, a radio bearer including a first logical channel on a first carrier and a second logical channel on a second carrier;
    determining whether to activate the radio bearer to perform duplication;
    communicating a first packet on the first logical channel and a duplicated first packet on the second logical channel in response to a determination to activate the radio bearer to perform duplication;
    obtaining one or more first measurements of a first channel condition in a first cell at the UE; and
    obtaining one or more second measurements of a second channel condition in a second cell at the UE;
    wherein the determining whether to activate the radio bearer to perform duplication includes:
    determining to activate the radio bearer to perform duplication in response to determining that the one or more first measurements are in a first predetermined relationship with one or more first predetermined thresholds and that the one or more second measurements are in a second predetermined relationship with one or more second predetermined thresholds.

12. A method of wireless communication of a user equipment (UE), comprising:
    receiving a radio bearer configuration;
    configuring, based on the radio bearer configuration, a radio bearer including a first logical channel on a first carrier and a second logical channel on a second carrier;
    determining whether to activate the radio bearer to perform duplication;
    communicating a first packet on the first logical channel and a duplicated first packet on the second logical channel in response to a determination to activate the radio bearer to perform duplication; and
    obtaining a measurement of a transmission condition at the UE, wherein the determining whether to activate the radio bearer to perform duplication includes:
    determining to activate the radio bearer to perform duplication in response to determining that the measurement of the transmission condition is in a predetermined relationship with a predetermined threshold.

13. The method of claim 12, wherein the measurement of the transmission condition measures at least one of
    a packet loss condition;

a packet error rate;
a physical channel block error rate (BLER);
a hybrid automatic repeat request (HARD) failure count;
a radio link control (RLC) retransmission count; and
missing packets based on packet data convergence protocol (PDCP) sequence numbers.

14. The method of claim 1, wherein the first packet is a packet data convergence protocol (PDCP) packet.

15. The method of claim 1, wherein the communicating the first packet on the first logical channel and the duplicated first packet on the second logical channel includes:
transmitting the first packet on the first logical channel in an uplink direction; and
transmitting the duplicated first packet on the second logical channel in the uplink direction.

16. The method of claim 1, wherein the communicating the first packet on the first logical channel and the duplicated first packet on the second logical channel includes:
receiving the first packet on the first logical channel in a downlink direction successfully; and
receiving the duplicated first packet on the second logical channel in the downlink direction successfully; and
discarding the duplicated first packet.

17. The method of claim 1, further comprising:
deactivating one of the first carrier and the second carrier in response to a determination not to activate the radio bearer to perform duplication; and
switching at least one component of the UE operating the deactivated carrier to a power saving mode.

18. The method of claim 17, wherein the switching the at least one component includes at least one of:
switching off a radio frequency (RF) transceiver operating the deactivated carrier;
entering, by the at least one component, into a discontinuous reception (DRX) inactive state; and
entering, by the at least one component, into a radio resource control (RRC) inactive state.

19. The method of claim 18, further comprising:
switching the at least one component to a normal mode from the power saving mode in response to a determination to activate the radio bearer to perform duplication.

20. An apparatus for a wireless communication, the apparatus being a user equipment (UE), comprising:
a memory; and
at least one processor coupled to the memory and performing, when instructed by code in the memory, operations of:
receiving a radio bearer configuration;
configuring, based on the radio bearer configuration, a radio bearer including a first logical channel on a first carrier and a second logical channel on a second carrier;
determining whether to activate the radio bearer to perform duplication;
communicating a first packet on the first logical channel and a duplicated first packet on the second logical channel in response to a determination to activate the radio bearer to perform duplication; and
obtaining one or more measurements of a channel condition at the UE, wherein the determining whether to activate the radio bearer to perform duplication includes:
determining to activate the radio bearer to perform duplication in an up-link direction in response to determining that the one or more measurements are in a predetermined relationship with one or more predetermined thresholds.

21. A non-transitory computer-readable medium storing computer executable code for a user equipment (UE), the computer-readable medium comprising code, when executed by a processor of the UE, instructing the processor to perform operations of:
receiving a radio bearer configuration;
configuring, based on the radio bearer configuration, a radio bearer including a first logical channel on a first carrier and a second logical channel on a second carrier;
determining whether to activate the radio bearer to perform duplication;
communicating a first packet on the first logical channel and a duplicated first packet on the second logical channel in response to a determination to activate the radio bearer to perform duplication; and
obtaining one or more measurements of a channel condition at the UE, wherein the determining whether to activate the radio bearer to perform duplication includes:
determining to activate the radio bearer to perform duplication in an up-link direction in response to determining that the one or more measurements are in a predetermined relationship with one or more predetermined thresholds.

* * * * *